(No Model.) 2 Sheets—Sheet 2.
C. P. LARNED & R. V. R. SILL.
RAILWAY CAR SIGNAL.
No. 388,420. Patented Aug. 28, 1888.
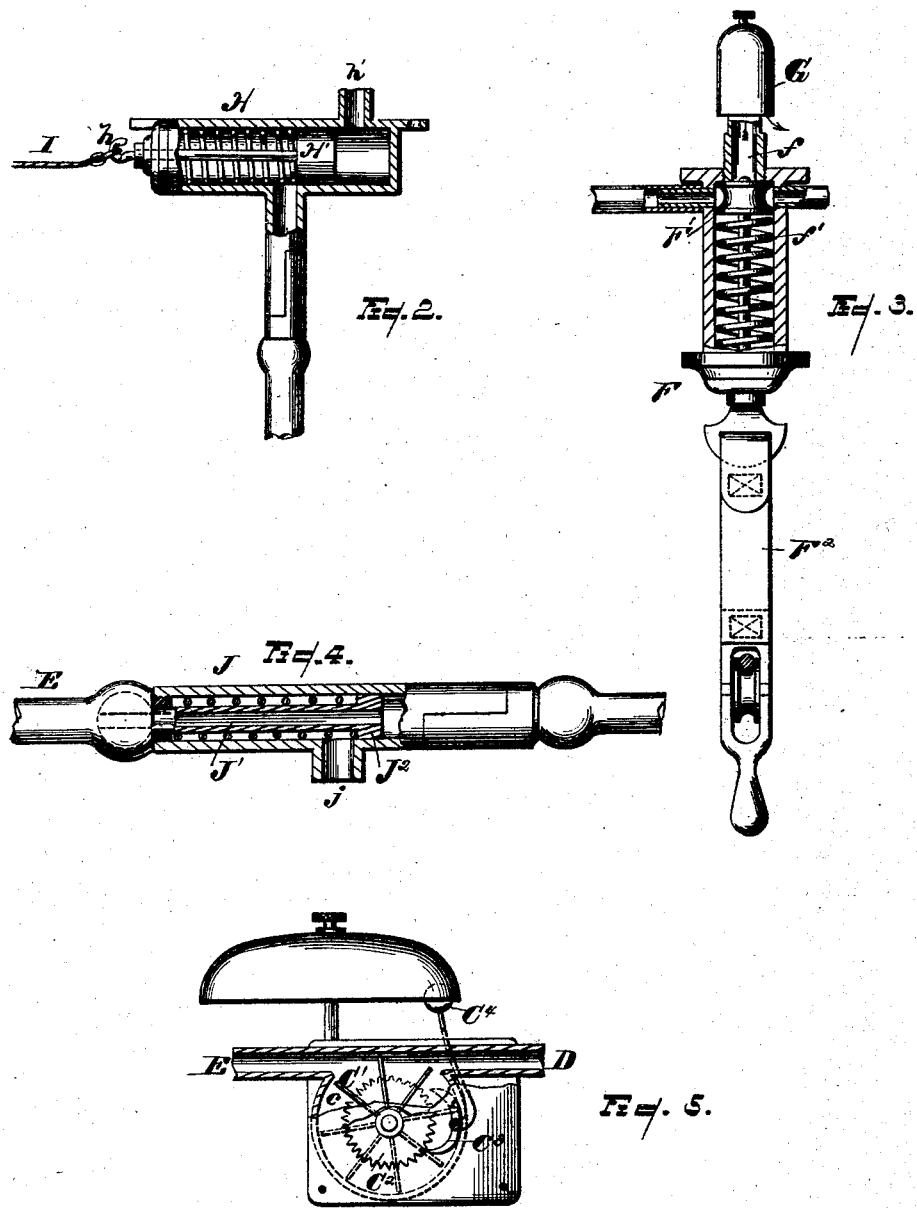

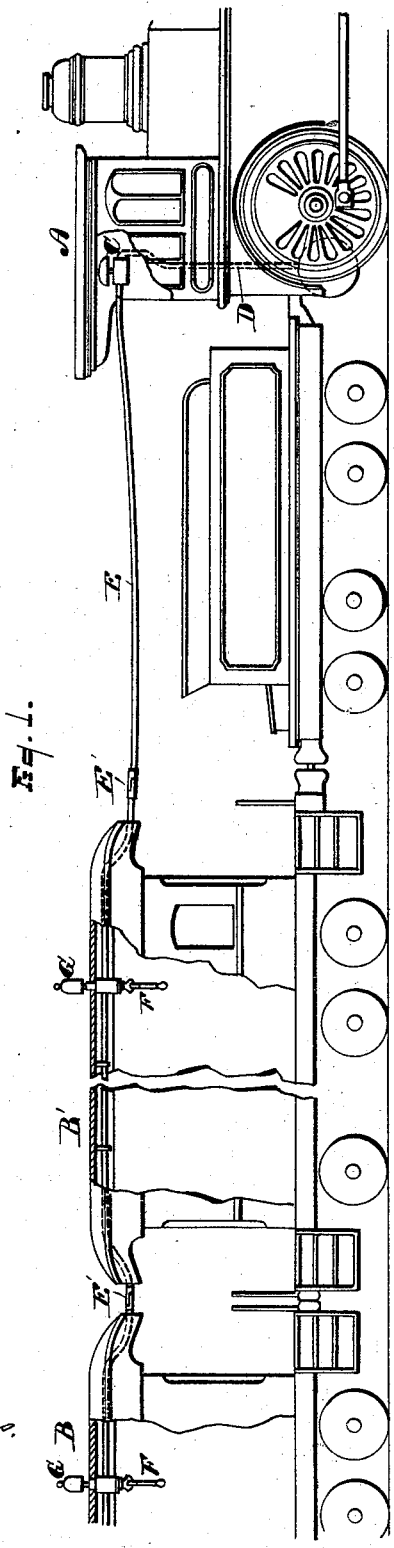

UNITED STATES PATENT OFFICE.

CHARLES P. LARNED AND RICHARD V. R. SILL, OF DETROIT, MICHIGAN.

RAILWAY-CAR SIGNAL.

SPECIFICATION forming part of Letters Patent No. 388,420, dated August 28, 1888.

Application filed March 15, 1888. Serial No. 267,219. (No model.)

*To all whom it may concern:*

Be it known that we, CHARLES P. LARNED and RICHARD V. R. SILL, citizens of the United States, residing at Detroit, county of Wayne, State of Michigan, have invented a certain new and useful Improvement in Railway-Car Signals; and we declare the following to be a full, clear, and exact description of the same, such as will enable others skilled in the art to which it appertains to make and use the same, reference being had to the accompanying drawings, which form a part of this specification.

In the drawings, Figure 1 is a side elevation representing a railway-train provided with our signaling apparatus. Fig. 2 is an enlarged view of the apparatus adapted for connection with a bell-cord. Fig. 3 is an enlarged view of the apparatus adapted for connection to the interior of a car. Fig. 4 is the apparatus adapted for connection to a rubber hose in which the hose might take the place of the ordinary bell-cord. Fig. 5 is a separate view of the signal-bell and its mechanism.

It is the purpose of this invention to produce a signaling apparatus whereby the conductor or other person in a railway-train may signal the locomotive-engineer, and is designed to take the place of the usual bell-cord appliances.

The invention consists, essentially, in the provision, in the engineer's cab, of a gong or bell adapted to be sounded by mechanism operated by compressed air, the said mechanism located, preferably, at the bell. From this mechanism the conduit leads to a compressed-air chamber or the ordinary air-brake apparatus, and a conduit leads from the bell back through the cars of the train, and provided with suitable couplings between the cars. In each car is provided means for permitting the air to escape, and so cause a blast of air through the signaling apparatus, which gives to it the necessary motion to sound the signal.

The invention consists, also, in combining with the said appliances in the various cars a bell, whistle, or other signal, which is simultaneously operated by the escaping air, so that the person giving the signal is thus made aware of the fact that the engineer's signal must necessarily have been simultaneously sounded.

We will now proceed to describe means embodying the invention.

A represents a locomotive-cab; B and B', the cars of a train.

C is our signal appliance in the cab.

D is the conduit leading to the compressed-air chamber or space.

E represents sections of conduit leading back through the train, which sections are coupled together by suitable couplings between the cars at E'.

F represents mechanism whereby the conductor or other person in the car may by a pull upon the depending strap cause compressed air to exhaust or escape, and so ring the bell in the cab.

G is a whistle, bell, or other signal constructed so as to be sounded by the escaping air.

Having thus outlined the invention and apparatus, we will proceed to describe it more fully.

The engineer's signal is more particularly shown in Fig. 5. C' is an interior wheel adapted to be revolved by the compressed air, which enters through D and is exhausted through E. This wheel is arranged through any convenient means—as, for instance, by a ratchet-wheel, $C^2$, and escapement $C^3$—to operate the bell-clapper $C^4$ whenever the wheel is caused to revolve. Any convenient friction or brake mechanism may be provided to prevent the wheel from moving of its own momentum, and whereby it is instantly brought to rest when the air-escape is closed. $c$ is a chamber designed for this purpose, being intended that as the wheel is propelled by the air passing through the apparatus it will cause the blades to compress to some extent a volume of air in the chamber $c$, which as soon as the escaping air is closed off will react against the blades of the wheel to instantly stop its further rotation.

We would have it understood that we do not limit ourselves to any particular kind of mechanism for sounding the bell, nor do we limit ourselves to a bell as a signaling apparatus, for any other signaling apparatus may be employed, and our invention in this respect is satisfied by any kind of a signaling apparatus which shall be adapted to operate by the passage through the apparatus of air from an air-chamber or other source of supply.

The apparatus F in the car may be constructed as follows: F' is an interior plunger connected with a handle, F². This plunger serves as a valve to close the air-escape port $f$, and is held seated by a spring, $f'$. The plunger has an annular channel, as shown, whereby when in its normal position the air may pass freely around it through the conduit E. Now, when it is desired to signal the engineer, the conductor may simply draw down upon the strap F². This draws the plunger F' away from its seat, opens the escape-orifice, and permits the compressed air to escape therefrom. The current thus created through the engineer's signaling device will sound his signal.

The whistle or signal G may or may not be employed. It is adapted to be sounded by the escaping air to give to the person signaling the knowledge that the apparatus is in order throughout, and that the engineer's signal must have simultaneously sounded.

The conduits in the different cars are provided between the cars with flexible connections and couplings E'. This may be of any convenient form, and the ordinary Westinghouse connection, which it is not necessary to describe, will answer every purpose.

It may sometimes happen that a car which is not provided with this signaling apparatus might be coupled onto the end of a train having the apparatus. To meet an emergency of this character, we would provide the cars having this apparatus with an appliance, H, provided with means $h$ for connection with an ordinary bell cord, which might lead into the ordinary car that has been coupled on. This is so arranged that the plunger H' prevents escape of the compressed air through the escape-orifice $h'$; but a draw upon the bell-cord I would immediately force the plunger forward and permit the compressed air to escape from the conduit E out through the orifice $h'$, and so signal the engineer.

Again, it might happen that a car not provided with this apparatus should be coupled intermediate in the train otherwise provided with the apparatus. To meet an emergency of this character, we would provide an appliance, J, and would have on hand a small compressed-air hose, which in a car thus coupled in would take the place of the ordinary bell-cord, and so form a section of the compressed-air conduit E. This may connect with the plunger-rod J'. The said rod being hollow and provided with a plunger, J², at its inner end, it is apparent that by simply grasping this bell-cord and drawing upon it in the ordinary way the plunger J² would be withdrawn past the escape-orifice $j$, and so the compressed air escaping would operate to sound the engineer's signal.

We would have it understood that these appliances F, J, and H may be varied to any extent without departing from our invention, and we would have it understood that our invention contemplates any convenient mechanism which may be operated by the conductor or other person in a car to create an escape of the compressed air, the means described being simply convenient means illustrating our invention.

We would have it understood, also, that we do not contemplate the location of all these appliances at all times upon every car, because usually it would not be necessary; but we may provide simply the direct fixtures E, or these fixtures in connection with the appliance H, or may employ all three of said appliances.

We would not limit this device strictly to a railway-train, for it is clearly applicable to steamboats or shops, or in other localities where there are means for producing a supply of compressed air.

The depending straps may be provided with the usual pulley or ring, $f$, so that an ordinary bell-cord may be used, if desired.

What we claim is—

1. A railway-car signaling device consisting of conduits D E, connecting the brake mechanism or other source of air-pressure with the cars, a signaling device, C, located in the locomotive at the juncture of said conduits, said signaling device consisting of a wheel, C', located in chamber $c$, ratchet-wheel C², and escapement C³, connected with the bell-clapper C⁴, and points in the conduit E for permitting the escape of the compressed air, thereby creating a draft and operating the signal, substantially as described.

2. A railway-car signaling device consisting of conduits D E, connecting a source of air-supply with the cars, and a signaling device, C, located in the locomotive at the juncture of said conduits and adapted to be operated by the passage of air along said conduits, and an escape, F, in the conduit E, consisting of an orifice having a whistle, G, mounted thereon, a valve, F', in the line of the conduit, having an annular passage around it for the circulation of air through said conduit, a spring, $f'$, normally closing said valve, and a strap, F², for opening said valve, substantially as described.

In testimony whereof we sign this specification in the presence of two witnesses.

CHARLES P. LARNED.
RICHARD V. R. SILL.

Witnesses:
M. B. O'DOGHERTY,
SAMUEL E. THOMAS.